Patented Jan. 1, 1946

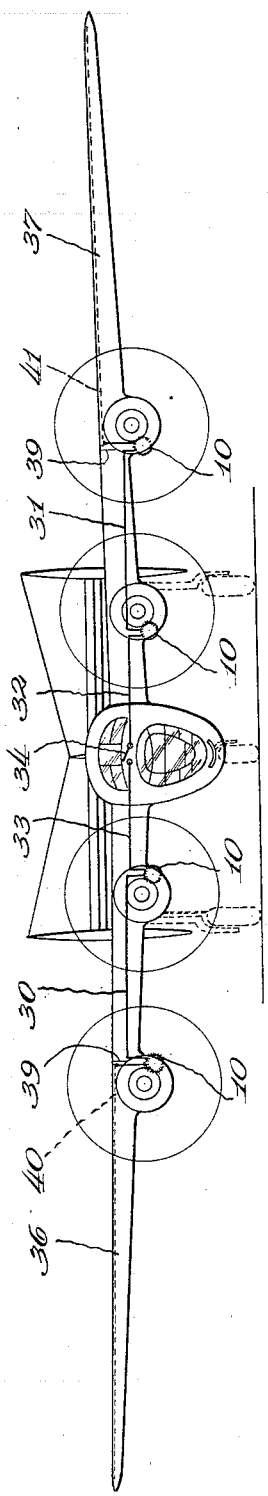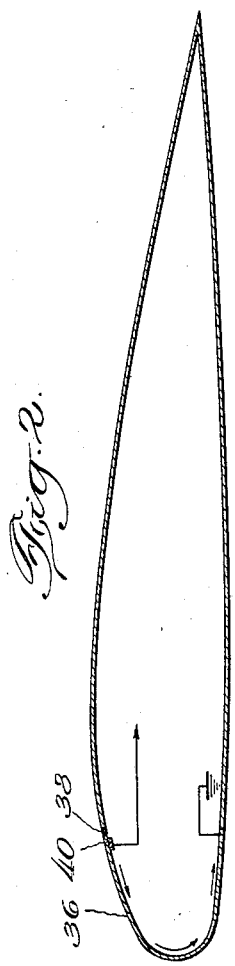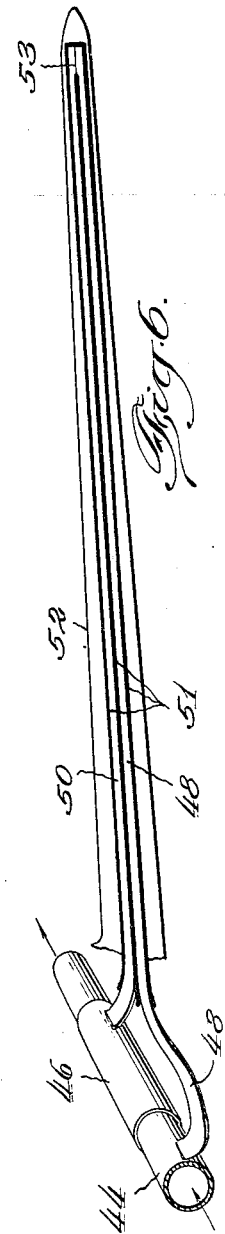

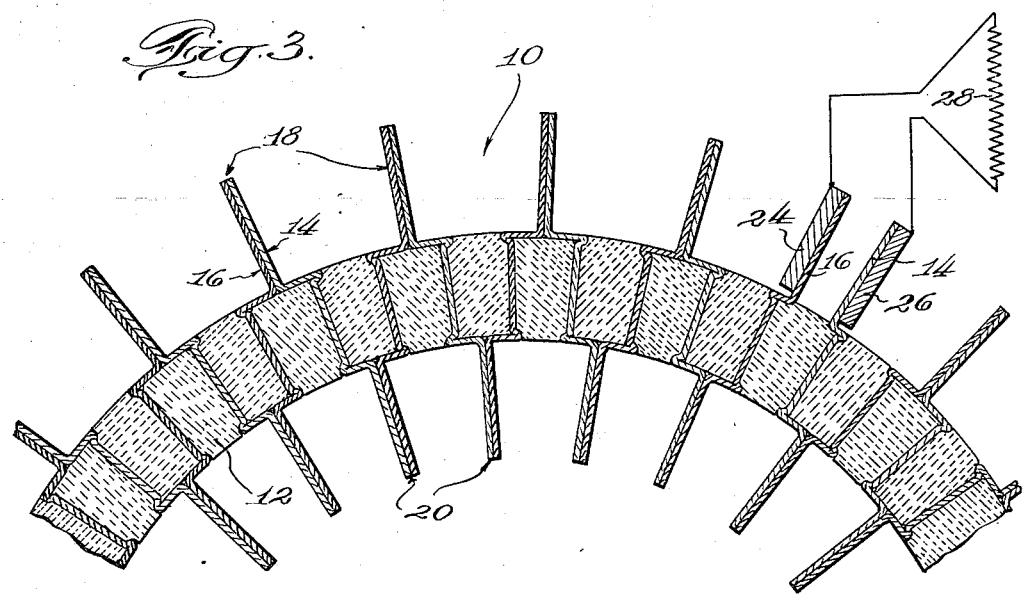
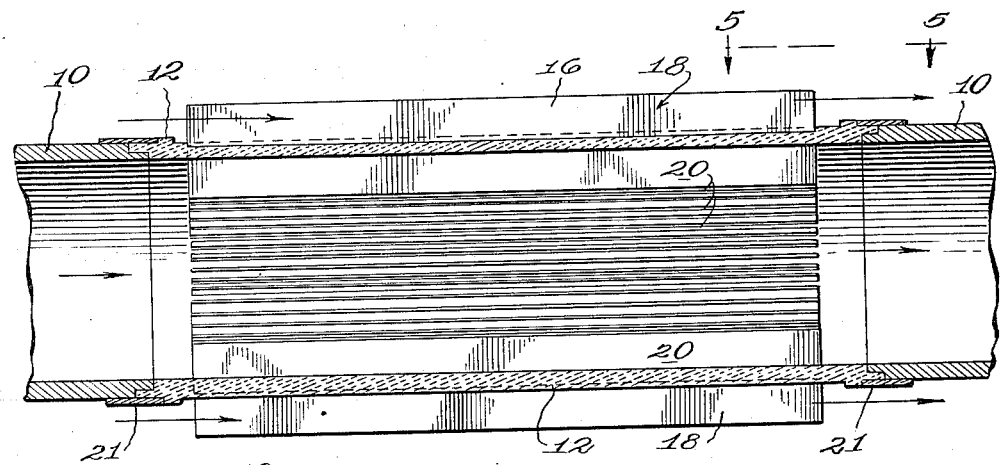
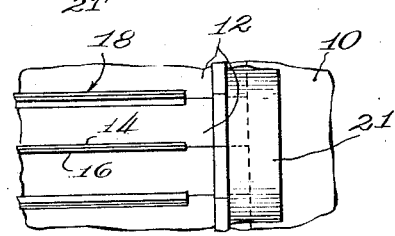

2,391,994

UNITED STATES PATENT OFFICE 2,391,994

ELECTRICAL GENERATING APPARATUS

Henry J. De N. McCollum, Chicago, Ill.; Thelma McCollum executrix of said Henry J. De N. McCollum, deceased Application August 20, 1942, Serial No. 455,537

1 Claim. (Cl. 244—134)

My invention relates generally to aircraft, and more particularly to improved means for utilizing the energy normally wasted in the form of exhaust gas heat from the aircraft engines.

A very large porportion of the energy of the fuel utilized in internal combustion engines is dissipated in the form of heat of the exhaust gases. Various efforts have been made to utilize this energy, principally in the form of apparatus for supplying heated air to the cabins of the aircraft. Even the most efficient heating apparatus of this character does not, however, extract more than a small portion of the total heat available in the exhaust gases.

It is therefore one of the principal purposes of my invention to provide simple and effective means for converting some of the heat energy present in the exhaust gases of an aircraft engine into a form in which it may be conveniently utilized.

A further object is to provide an improved electrical generating system for aircraft which utilize the difference in temperatures of the exhaust gases and atmospheric air to generate electricity.

A further object is to provide an improved thermo-electric generator in which the load forms part of the internal circuit of the generator.

Other objects will appear from the following description, reference being had to the accompanying drawings, in which:

Fig. 1 is a front elevational view of a four-motored airplane, incorporating the invention;

Fig. 2 is a somewhat diagrammatic transverse sectional view of an airplane wing illustrating the manner in which electrical energy may be utilized for deicing purposes;

Fig. 3 is a fragmentary transverse sectional view of a section of the exhaust pipe of an aircraft engine having a thermopile generator incorporated therein;

Fig. 4 is a diametrical longitudinal sectional view of a section of the exhaust pipe of an aircraft engine and incorporating a thermoelectric generator;

Fig. 5 is a fragmentary plan view taken on the line 5—5 of Fig. 4; and

Fig. 6 is a diagrammatic front elevational view of a portion of an airplane wing illustrating a modified form of the invention.

The invention is illustrated as forming a part of a four-motored airplane shown in Fig. 1, the engines of which have exhaust pipes 10. As best shown in Figs. 3, 4, and 5, the exhaust pipe 10 has a thermoelectric section interposed therein, this section comprising a plurality of molded bars 12 formed of a heat resistant and electrically insulating material, such as a refractory ceramic. The ceramic should also be a reasonably good insulator against the transmission of heat, and should be relatively non-frangible and light in weight. The bars 12 form separators for elemental fin strips 14 and 16, which are made of different metals or alloys having, in combination, the desirable thermoelectric properties and being highly resistant to deterioration by high temperatures and corrosion. The strips 14 and 16 are conformed to provide external fins 18 and internal fins 20, each fin formed by a portion of one of the strips 14 and a portion of one of the strips 16, these portions of the strips being welded or otherwise secured together near their edges, or if desired, throughout their contacting surfaces so as to provide substantially solid fins. The fins 20 project radially into the stream of exhaust gases from the engine, while the fins 18 are located in the atmospheric air stream, so that there will normally be a large difference in the temperatures of the fins 18 and 20.

The ceramic bars 12 are held in assembled relation with the fins and are secured to the ends of the exhaust pipe 10 by bands 21, which may be clamped or otherwise secured in position.

From an examination of Fig. 3, it will be apparent that the strips 14 and 16 thus have their surfaces connected alternately in series, with alternate connections inside and outside of the exhaust pipe, so that each pair of fins consisting of an internal fin 20 and an external fin 18 will constitute an elemental thermocouple, which will be capable of generating electrical energy whenever there is a substantial difference between the temperatures of such two fins. It will be noted that the areas of contact between the portions of the strips 14 and 16 which are welded together to form the fins 18 and 20 are large, and, since the temperature difference is great, a current of relatively high amperage will be generated by each elemental thermocouple. The elemental thermocouples are connected in series to multiply the generated voltage, and suitable bus conductors 24 and 26 are welded or otherwise suitably secured to the strips 16 and 14, respectively, which constitute the end strips of the series. Any suitable load, such as a resistance 28, may be connected to the bus conductors 24, 26, to utilize the generated current.

As shown in Fig. 1, the thermoelectric generators associated with the exhaust pipes 10 of the two outermost engines, each has one terminal connected to the metallic wing structure, the other terminals of these generators being connected by conductors 30, 31, respectively, with the generators associated with the exhaust pipes 10 for the innermost engines of the airplane. The other terminals of the thermoelectric generators of the inner engines are connected to conductors 32, 33, which may be connected by closing a switch 34.

When the current generated by the thermoelectric generators is to be utilized for wing deicing purposes, the leading edge sections 36, 37 of the end portions of each of the wings is in part insulated from the remaining portion of the wing structure by any suitable means, as by longitudinal strips of insulation 38 and transverse strips 39, and is made of a suitable metal having a fairly high resistance, such as a nickel-chromium alloy or a chromium steel, such as stainless steel.

Along the insulated longitudinal edge of the leading edge of the wing sections 36, 37, are secured bars 40, 41, of aluminum or other good conductor, and the lower longitudinal edge of these leading sections of the wing are mechanically and electrically connected to the metallic wing structure, illustrated in Fig. 2 as being grounded. Thus, assuming the wire connections shown in Fig. 1, when the switch 34 is closed, current generated by the thermopiles will flow through the conductor 40 associated with one of the wing portions, will flow transversely through the leading edge section 36, through the metallic structure of the wing and fuselage, and hence through the leading edge portion 37 to the conductor 41 associated therewith, and hence to the other terminal of the series of thermopiles.

The leading edges 36, 37, in series, thus constitute the load upon the series connected thermoelectric generators, and preferably have a total resistance generally equal to the internal resistance of the series of generators. Thus, a substantial portion of the electrical energy generated will be converted into heat in the wing portions 36, 37. Therefore, even though the potential generated across each thermocouple is but a small fractional part of a volt, the connection of a large number of these couples in series results in providing a current of useful voltage, and due to the fact that the area of contact between the two thermoelectric strips where they are joined to form the fins is of great extent, the amperage of the current generated will be appreciable.

Whenever the thermoelectric generators are not in use for deicing purposes, connections may be provided for utilizing the electrical energy for other purposes, such as the operation of electrical instruments, radio equipment, and the like. In fact, the apparatus may be conjointly used for both purposes. When the electrical energy is to be used for purposes requiring higher voltage than generated, the current may be passed through a suitable interrupter to convert it to alternating current and its voltage stepped up by means of a transformer. Thus, the generating system may be used to supply electrical energy to accessories on the airplane in the same manner that any other low voltage and high amperage source of electrical energy might be utilized.

The external fins 18 of the thermoelectric generators are preferably located directly in the air stream so that they will be capable of rapid heat dissipation and may be maintained at a temperature closely approaching that of the atmosphere. Because of this wide temperature difference between the exhaust gases and the atmospheric air, the wattage output of the generators is substantial, making it feasible to utilize these generators as power output devices rather than merely as temperature measuring devices, as in the past.

The formation of ice upon the leading edges of the wings is one of the principal hazards of flying. Formation of ice upon other wing surfaces is, of course, disadvantageous in that it increases the weight of the plane and also increases the drag. However, upon the leading edges of the wings, the ice tends to form in a ridge which builds up to extend forwardly of the leading edge and then widens or mushrooms out to so substantially alter the aerodynamic properties of the wing that its lift is greatly affected. Therefore, prevention of the formation of ice upon the leading edges of the wings is a substantial forward step in the solution of the problem of prevention of accidents due to icing. If the formation of ice at the leading edge is prevented, the pilot will usually, even when flying in the most adverse flying conditions, be able to make a forced landing.

Since ice forms upon the leading edge of an airplane only through a very limited range of temperature and humidity conditions, it requires but a small increase in the temperature of the leading edge of the wing to inhibit the formation of ice at this point. Such slight rise in temperature may be effected by the electrical generating system herein disclosed, and this system has the advantage over such systems wherein the heat of the exhaust gases is directly applied to the wing surfaces in that the back pressure upon the engine exhaust pipes is not materially increased and that the use of complicated and relatively heavy conduits from the exhaust pipe of the engine to the surfaces to be heated is avoided.

In the system disclosed herein, the metal wing and its frame constitute a conductor for the current used to heat the wing surfaces, so that the necessity of providing heavy conductors for this low voltage high amperage current is limited to the short connections between the several generators and the adjacent bus conductors 40, 41. However, although the generators are illustrated as being connected in series, it may under certain circumstances be desirable to connect them in parallel. In some installations, it may be feasible and desirable to conduct some of the current generated by the thermoelectric generators to control and other surfaces of the aircraft at which there is a pronounced tendency for the formation of ice.

In the modified form of the invention shown in Fig. 6, the thermoelectric generator has but one hot and one cold junction, the hot junction being formed between an exhaust stack 44 and a sleeve 46 surrounding the stack. The stack 44 and sleeve 46 are made of different metals or alloys which form efficient thermoelectric generators, such metals as "Advance" and "Chromel" being suitable. The exhaust stack 44 has a strip 48 of the same metal or alloy which extends to and along the leading edge of the wing 52 of an airplane, being joined at its extremity to a strip 50 of the same metal as the sleeve 46, the junction of the ends of these two strips 48 and 50 being at their extremities, indicated as the point 53. The strips 48 and 50 are insulated from one another (except for the junction 53), and are insulated from the wing structure of the airplane by suitable insulation 51. By virtue of this construction, a thermoelectric generator is formed in which the contact between the sleeve 46 and exhaust stack 44 (which contact may be provided by welding these parts together) provides the hot junction, while the cold junction is located at the point 53.

It will be noted that the thermoelectric generator has no external circuit, it being in effect short-circuited. However, the current flow through the strips 48 and 50 results in heating these strips and inhibiting the formation of ice upon the leading edge of the wing. Because of this arrangement, the internal resistance of the generator itself is effectively utilized, and as a result, the current flow through the generator will be proportionately greater than if it were connected to an external load circuit. The strips 48 and 50 are of such cross-sectional area that they will provide the resistance required to cause them to be maintained at a temperature higher than that of the atmosphere, and thus make them effective for inhibiting the formation of ice.

Since this apparatus has no moving parts, and no parts which wear out or deteriorate in use, a thermoelectric generator of this construction may be continuously connected and maintained in operation at all times. This principle of utilizing or incorporated the load as part of the internal resistance of the thermoelectric generator may be applied in other forms, whether the load be purely resistive or whether, as by interposition of an interrupter, it is inductive in character.

While I have shown and described a particular embodiment of my invention, it will be apparent to those skilled in the art that numerous modifications and variations may be made therein without departing from the underlying principles of the invention. I therefore desire, by the following claim, to include within the scope of my invention all such modifications and variations by which substantially the results of my invention may be obtained by the use of substantially the same or equivalent means.

I claim:

Apparatus for heating the leading edge of an airplane wing to inhibit the formation of ice thereon comprising, a thermoelectric generator, said generator having one junction thereof heated by the exhaust gases of the airplane engine, having its other junction located along the leading edge of the wing near the tip thereof, and having conductors connecting said junctions, the major portions of said conductors being in the form of spaced flat metallic strips extending along the leading edge surface of the wing and insulated therefrom, whereby said conductors are heated due to the resistance of the thermoelectric generator.

HENRY J. DE N. McCOLLUM.